April 25, 1939.  W. W. WISHART  2,155,460
COMPRESSOR
Filed Aug. 17, 1935  3 Sheets-Sheet 1

Inventor:-
William W. Wishart
By:- Cox & Moore
attys

April 25, 1939.  W. W. WISHART  2,155,460
COMPRESSOR
Filed Aug. 17, 1935   3 Sheets-Sheet 2
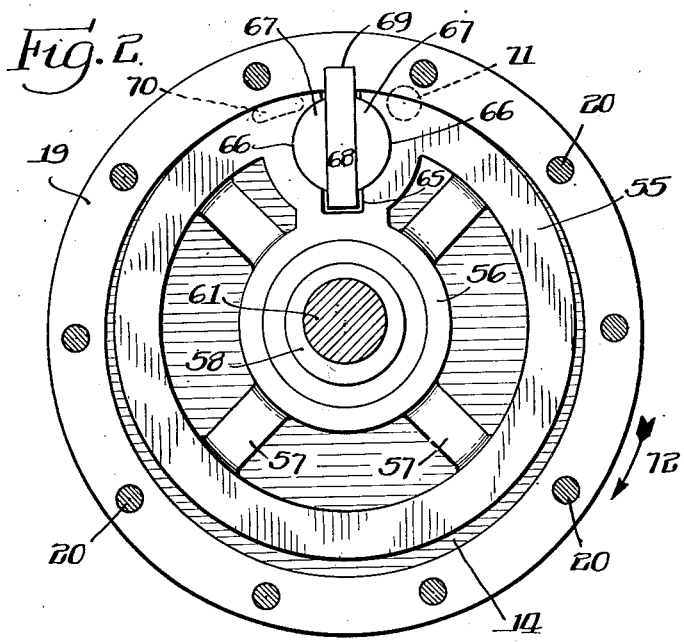
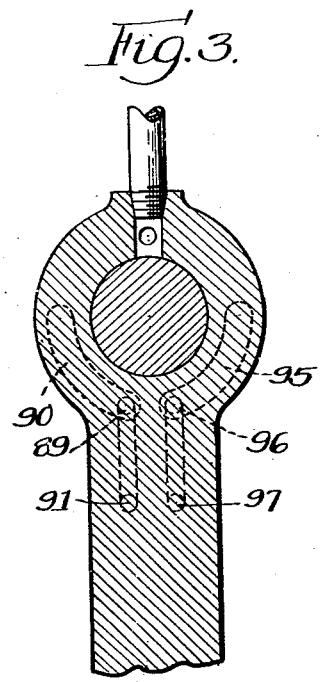
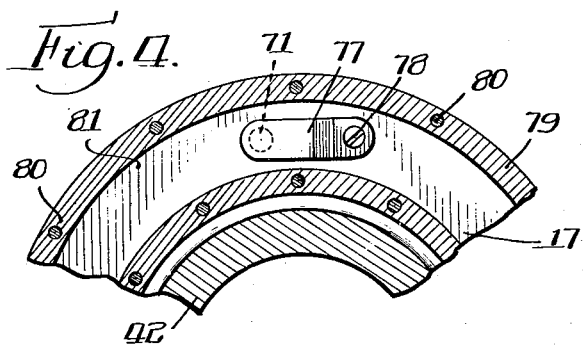
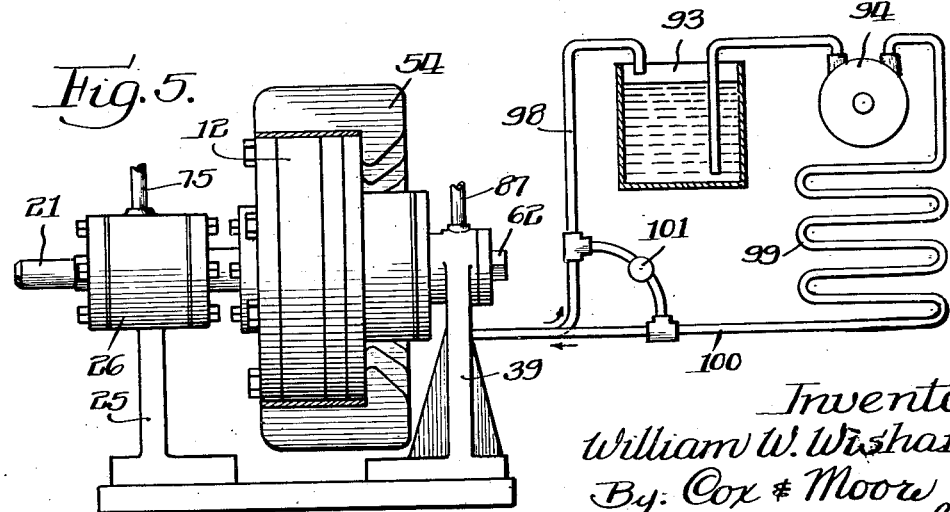
Inventor:
William W. Wishart
By: Cox & Moore attys.

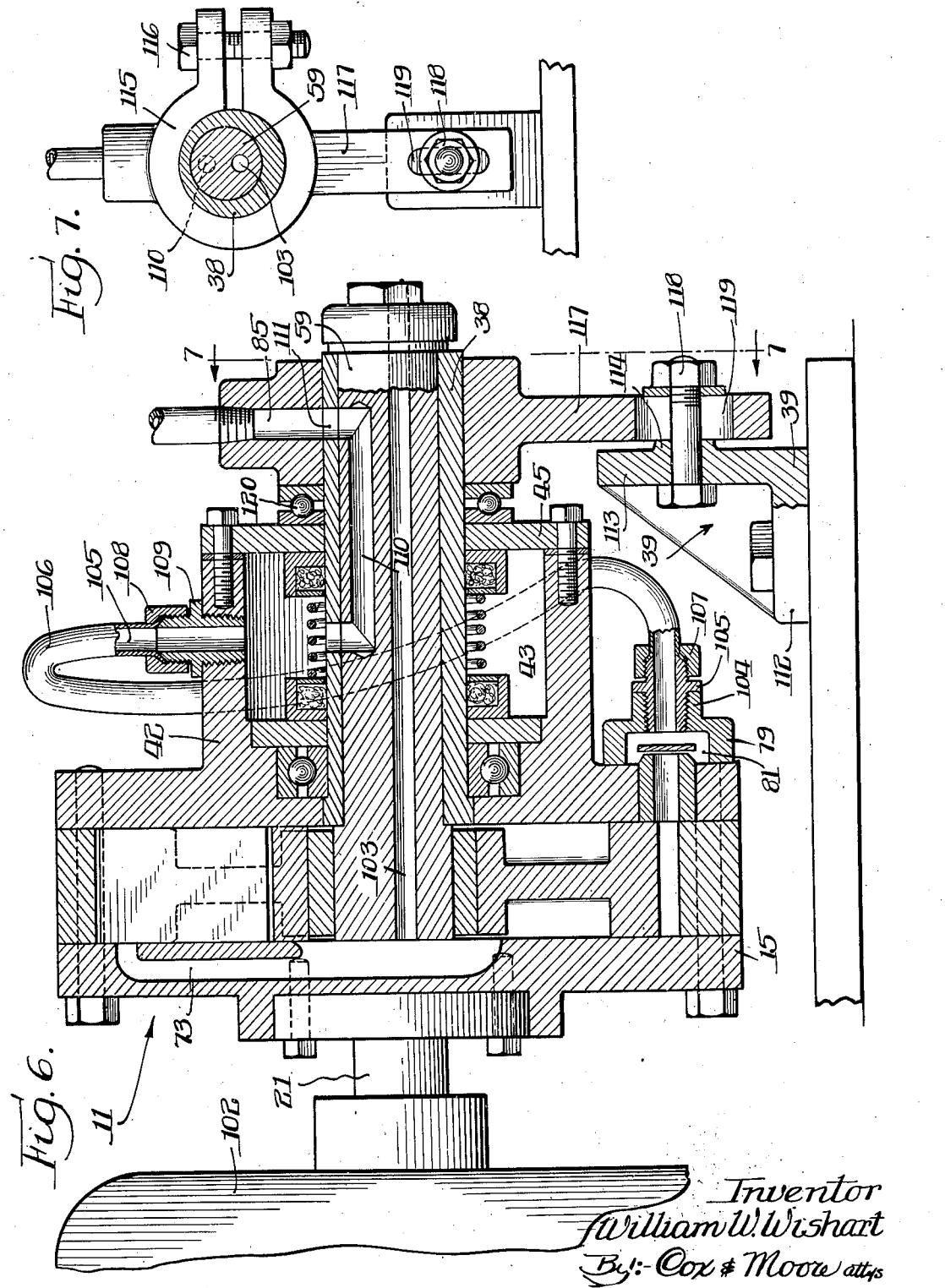

Patented Apr. 25, 1939

2,155,460

UNITED STATES PATENT OFFICE 2,155,460

COMPRESSOR

William W. Wishart, Chicago, Ill.

Application August 17, 1935, Serial No. 36,631

9 Claims. (Cl. 230—140)

This invention relates in general to a fluid flow apparatus and more especially to a fluid forcing device or compressor.

An important object is to provide a compressor having improved sealing means, including structural arrangements for preventing leakage of fluid from and in the compressor, a further object being to form the device compactly so as to obtain maximum capacity in a device of minimum weight and size.

Another important object is to provide a rotary fluid forcing device having relatively shiftable cylinder and piston means defining a working space therebetween and including inlet and discharge channels formed in the walls of the cylinder, wherein the cylinder is rotatingly mounted upon and between a pair of spaced supporting elements, the cylinder being formed with an axle journalled in at least one of said support elements wherein said support element forms a sealed inlet chamber and the axle has a longitudinal channel communicating with the interior of said chamber and with radial inlet channel formed in a wall of the cylinder on which the axle is mounted whereby to afford leak-proof inlet passages to the work space.

Among the other important objects of the invention is to provide for the discharge of fluid from the working space into an annular receiving chamber formed peripherally on the cylinder and communicating with ducts extending in and through a stationary support on which the cylinder is mounted for rotation; to provide for the lubrication of the compressor by delivering, into the apparatus, a lubricant under pressure greater than that developed in the fluid work medium in the working chamber whereby to seal the device against fluid leakage between the high and low pressure sides thereof; to provide a sealed compressor for circulating a lubricant in the compressor of a refrigerating system of the compressor, condenser, expander type without, however, utilizing an enclosing casing for the purpose of sealing the unit; to provide simplified means for varying the eccentricity of the piston and cylinder axes to adjust the operating contact of the piston within the cylinder from outside of the cylinder without dismantling the same; to mount the piston for rotation on a shaft extending within the cylinder and to form a fluid conduit for the work medium in said shaft; a further object being to form an inlet as well as an outlet conduit in the piston carrying shaft; to provide a receiving chamber in a wall of the rotating cylinder; to utilize a conduit comprising at least in part a flexible tube to deliver the compressed work medium from the working space of the compressor into said receiving chamber; to provide for supporting the compressor cylinder directly on the shaft of its driving motor and to journal another portion of said cylinder on a self-aligning support element whereby the bearings of the driving motor support at least a part of the rotating weight of the cylinder.

Numerous other objects, advantages and inherent functions of apparatus embodying the invention will be more fully understood from the following description which, taken in connection with the accompanying drawings, discloses preferred embodiments of the invention.

Referring to the drawings:

Figure 1 is a longitudinal section taken through a compressor embodying my present invention.

Figures 2, 3 and 4 respectively are sectional views taken substantially and respectively along the lines 2—2, 3—3 and 4—4 in Figure 1.

Figure 5 is a perspective view of a modified form of the device shown in Figure 1 and illustrating means to deliver lubricant under pressure into the device for sealing and lubricating the same.

Figure 6 is a sectional view taken through a modified compressor embodying my present invention.

Figure 7 is a sectional view taken substantially along the line 7—7 in Figure 6.

Figure 1:
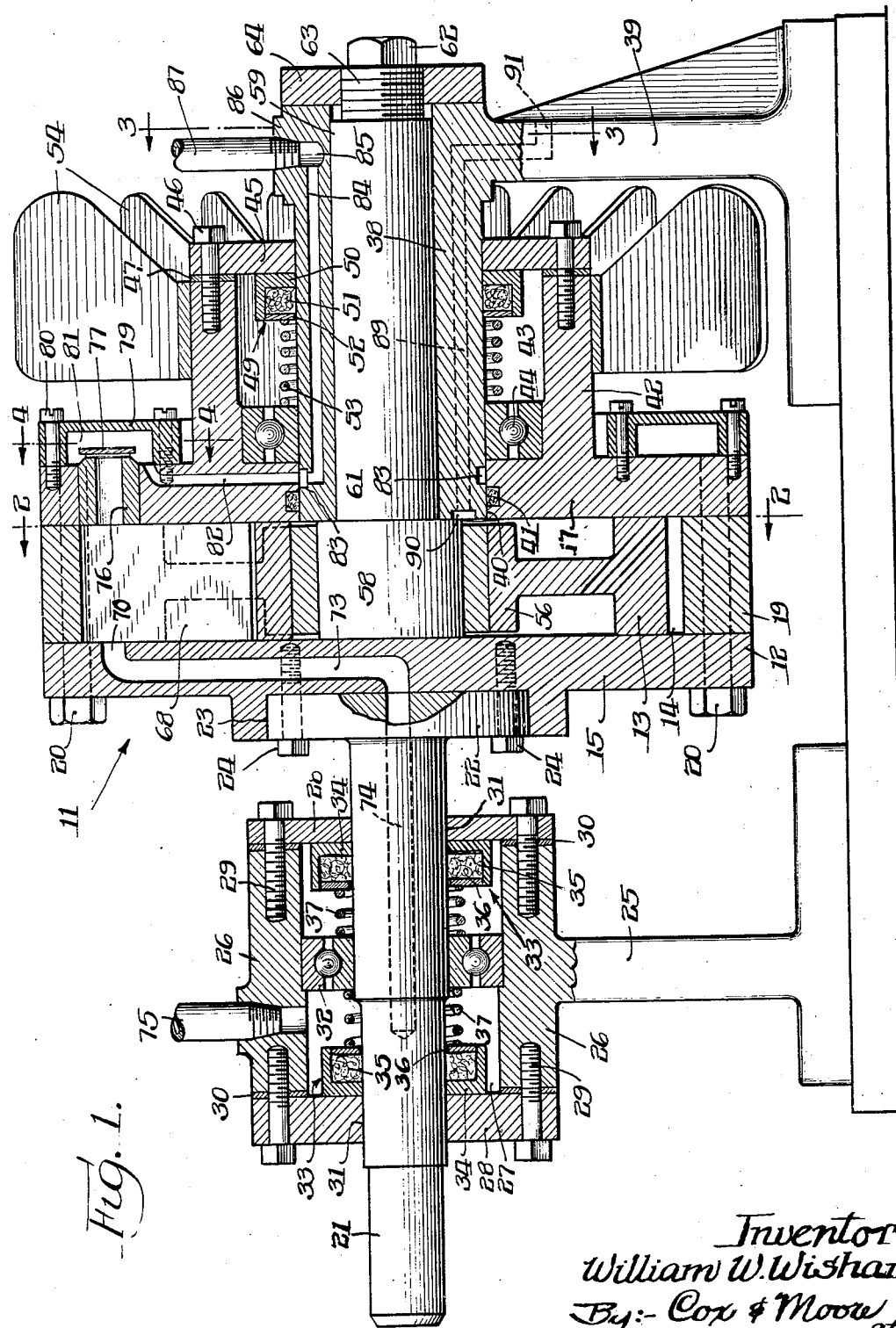

To illustrate my invention I have shown on the drawings a compressor 11 comprising cylinder means 12 and piston means 13 within the cylinder means and forming therewith a working space 14. The cylinder means may, of course, be formed in any preferred manner but it is preferable to form the cylinder as an assembled element comprising a pair of spaced end plates 15 and 17 of preferably circular configuration and an intermediate annular element 19 comprising a ring clampingly secured by and between the end plates 15 and 17, the parts being secured together in any suitable fashion and, preferably, by means of the holding studs 20.

The end plate 15 carries a shaft 21 having a flanged end 22 secured in a seat 23 formed in the end plate 15, preferably by means of holding studs 24. The shaft 21 extends through and is journalled in a support pedestal 25, the upper portions of which comprise cylindrical walls 26 defining an open-ended cylindrical chamber 27, the ends of which are closed by cover plates 28, preferably secured to the ends of the walls 26 as by the holding studs 29, suitable gasket means 30 being interposed between the peripheral edges of the plates 28 and the ends of the walls 26. The plates 28 are formed with openings 31 through which the shaft 21 extends. Within the chamber 27 the shaft carries a suitable anti-friction bearing 32 which is disposed substantially centrally of the chamber and annular sealing rings 33 are, or may be, assembled on the shaft within the chamber 27 in position to seal the openings 31, said sealing rings 33 comprising cup-shaped elements 34, annular packing material 35 compressed within the cup-shaped elements 34 by means of washers 36 and springs 37 which engage the rotating part of the bearing 32 at one end and the washers 36 at the other end.

The end plate 17 of the cylinder is supported on a sleeve-like element 38 forming a part of a pedestal 39, the end plate having a central opening 40, the edges of which ride upon the outer surface of the sleeve-like element 38, an annular sealing element 41 being disposed in said opening. The end plate 17 carries an annular extension 42 defining with the sleeve 38 a chamber 43 in which an anti-friction bearing 44 is mounted. The outer end of the chamber 43 is closed by a cover plate 45 secured in place on the edges of the annular portion 42, preferably by holding studs 46, a suitable gasket 47 being interposed between the peripheral portions of the plate 45 and the edges of the walls 42.

A seal ring 49, of construction similar to the rings 33, is preferably positioned in the chamber 43 in order to seal the opening in the plate 45 through which the sleeve 38 extends, said seal ring comprising a cup-shaped element 50 containing an annular packing ring 51 held in place by a washer 52 and spring means 53 extending between the washer and the stationary portion of the bearing 44. The walls 42 also carry means 54 forming fan blades whereby when the cylinder is rotated, as by means of a motor drivingly connected with the shaft 21, air may be circulated by the fan blades over the walls of the cylinder in order to dissipate heat generated by the compression of a fluid medium within the cylinder.

The piston 13 comprises an annular rim 55 which is substantially equal in width to the ring 19 so that the edges of the rim ride upon the facing surfaces of the end plates 15 and 17. The piston also comprises a hub 56 with which the rim 55 is joined by arms 57. This hub 56 is journalled in any suitable or convenient manner upon a portion 58 of a support shaft 59, having other portions 61 extending in and supported by the sleeve 38. The shaft portion 58 is slightly eccentric with respect to the shaft portions 61, as is clearly apparent from an inspection of Figure 2 of the drawings. The shaft portions 61 in turn are also eccentric with respect to the axis of the axle 21, that is to say, with respect to the axis about which the cylinder rotates. For this reason the piston is eccentrically supported within and with respect to the cylinder. The eccentricity of the piston with respect to the cylinder may be adjusted by turning the shaft 59 in the sleeve 38 by means of a suitable turning instrument applied to the non-circular projecting end 62 of the shaft. The outer end of the shaft also is threaded as at 63 to receive a clamping nut 64 by means of which the shaft may be locked in the sleeve in adjusted position. The rim 55 of the piston is formed with a radial slot 65, the opposite sides of which are formed with semi-circular seats 66 for the reception of bearing blocks comprising segmental elements 67 of semi-circular cross-sectional configuration. These bearing blocks have a length substantially equal to the width of the rim and have their flat faces in sliding engagement with a radially extending blade 68 carried by the ring 19. This blade 68 is secured in a slot 69 formed in the inner surface of the ring and extends between the facing surfaces of the end plates 15 and 17, the end plates clampingly engaging the opposite side edges of the blade.

It will be seen that the relative eccentricity of the piston and cylinder will cause the former, at its peripheral edge, to engage the inner surface of the cylinder along a line of contact which will lie in a fixed plane, including the rotary axes of the piston and the cylinder. In the illustrated embodiment this plane is the vertical plane through the cylinder. If the cylinder is rotated, the driving connection provided by the blade and the bearing blocks will cause the piston also to rotate and will cause the blade to travel around the axis of the cylinder. This will cause the volume of the work space 14 to progressively decrease in front of the blade from a maximum to zero and will cause the work space to increase in volume from zero to a maximum behind the blade during each rotation of the cylinder. An inlet port 70 is in communication with the work space behind the blade and an outlet port 71 is in communication with the work space in front of the blade. In the arrangement shown in Figure 2, the inlet port 70 is positioned to the left of the blade 68 while the outlet port 71 is to the right and in such an arrangement the rotation of the cylinder will be clockwise, as indicated by the arrow 72. It will be seen, therefore, that, as the cylinder is rotated through one complete cycle, a charge of the fluid work medium to be compressed will be drawn into the work space behind the blade. This charge, during the succeeding cycle, will be compressed and expelled through the outlet 71.

It is preferable to form the inlet port 70 in the surface of the end plate 15 near the edge of said plate and to form an inlet duct 73 extending radially in the end plate 15 from the port 70 substantially to the axis of the cylinder and to form a communicating channel 74 extending longitudinally in the axle 21. This communicating duct 74 opens into the chamber 27 with which is connected an inlet conduit 75 so that a work medium delivered into the chamber 27 through the conduit 75 may be drawn through the connecting ducts 74 and 73 and enter the work space through the port 70.

It is preferable to form the outlet opening 71 as a channel in a fitting 76 seated in an opening formed in the end plate 17, said fitting having an end extending outwardly of the end plate and forming a seat and a spring 77 forming an outwardly opening valve. The spring 77 may be fastened to the end plate 17 by means of a stud 78 and an annular channelled element 79 is applied to the rim as by studs 80 in position to enclose the spring 77 and provide an annular exhaust chamber 81 at the rim of the end plate. This exhaust chamber may be connected by means of a duct 82 extending radially in the end plate with an annular groove 83 formed in the outer surface of the sleeve 38 opposite edges 40 defining the central opening of the end plate. The sleeve 38 also has a duct 84 extending in the walls thereof and connecting the groove 83 with a duct 85 opening outwardly in a boss 86 formed in the pedestal 39 and through which the compressed work medium, expelled through the fitting 76, into the receiving chamber 81 and the ducts 82 and 84, may be delivered from the compressor. To this end an exhaust pipe 87 may be connected with the outlet duct 85 in order to carry the compressed fluid to any desired place of delivery.

It will be noted that the inlet side of the compressor, including the inlet duct 73, is entirely separated from the outlet or compression side, including the chamber 81 and the ducts 82, 84 and 85.

Leakage between the compression and suction side of the apparatus, therefore, may occur only between the relatively shiftable working surfaces of the piston and cylinder, that is to say, the gases under compression in the work space 14 in advance of the blade 68 may escape between the end plates and the side edges of the rim of the piston into the space between the rim and hub of the piston and escape thence between the end plates and the side edges of the piston rim into the work space 14 behind the blade 68. In order to minimize such leakage and, at the same time, to lubricate the operating parts of the machine, a preferably liquid lubricant may be introduced into the space defined between the end plates and between the hub and rim of the piston. The lubricant is preferably introduced at a pressure slightly in excess of the maximum pressure developed in the work medium during the operation of the compressor. It has been found that for most satisfactory operation, the lubricant should be introduced at a pressure of from five to ten pounds greater than the pressure developed in the work medium. The lubricant may be introduced through a duct or channel 89 formed in the sleeve 38 and opening at one end in a groove 90 formed in the end of the sleeve and communicating with the interior of the cylinder, the duct 89 opening as at 91 on the pedestal 39. The lubricant, which is preferably a suitable oil, may be drawn from a receiver or reservoir 93 by means of a pump 94 and delivered to the duct 89 at a desired pressure.

It is preferable to cause the oil to circulate continuously through the compressor in order to assist in cooling the same and to this end, the end of the sleeve 38 may be formed with an additional groove 95 in communication with the interior of the cylinder which connects with a duct 96 extending in the sleeve 38 and opening on the pedestal 39 at 97. This duct may be connected as by means of a pipe 98 to discharge lubricant into the receiver 93 from whence the lubricant is drawn by the pump 94 for re-delivery into the compressor. The oil, in circulating through the compressor, becomes heated and serves to maintain the compressor at a relatively low operating temperature and it is preferable to connect a cooling device 99 in the oil delivery conduit between the pump 94 and the oil inlet duct 89 in order that cool oil may be delivered to the compressor to maintain a low operating temperature therein. The cooler 99 may be connected with the inlet duct 89 by means of a pipe or conduit 100 and the pressure of oil delivered into the compressor may be regulated by providing a by-pass valve 101 between the delivery pipe 100 and the oil outlet pipe 98. By closing the valve a maximum oil pressure may be delivered in the compressor and by opening the valve 101 the lubricant may be caused to by-pass the compressor in order to reduce the oil pressure therein. The valve, of course, may be adjusted to cause delivery of any desired pressure.

In Figures 6 and 7 a modified arrangement is shown in which the end plate 15 is formed as a flange fast on the shaft 21 which comprises the drive shaft of a motor 102, the pedestal being thus eliminated and the compressor supported by the bearings of the motor. This expedient results in a considerable reduction in the overall length of the motor and compressor. With this arrangement, however, it is desirable to provide means other than a channel through the axle 21 to permit the work medium to be delivered into the work space. To this end the radial inlet duct 73 communicates at its inner end with a channel 103 extending longitudinally through the shaft 59, the duct 103 opening at the exposed end of the shaft to receive the work medium. It is possible, of course, to apply sealing means between the end of the shaft 59 and the facing surface of the end plate 15 in which the inner end of the duct 73 opens in order to seal the space within the cylinder and between the rim and hub of the piston from the low pressure conduits 73 and 103. A seal of the character shown in copending application Serial No. 743,196, may be employed. Such a seal is desirable if it is desired to lubricate the structure in a manner similar to the arrangement shown in Figure 1. Many compressors, however, and particularly those where the work medium itself comprises a lubricant, do not require the provision of pressure lubricating and sealing means; in fact, in the structure shown in Figure 1, the pressure lubricating system may be eliminated where the work medium itself comprises a lubricant. The pressure lubricating and sealing means also is unnecessary in many applications where a lubricant is dissolved in or otherwise carried by the work medium as is the case in refrigerating systems utilizing a refrigerating medium, such as, methyl chloride. For this reason the arrangement shown in Figure 6 is particularly well adapted for use in a methyl chloride refrigerating system. In Figure 6 is also shown an alternate mode of conducting the compressed work medium from the chamber 81 to the delivery duct 85. To this end in Figure 6 the channelled element 79 is provided with an embossment 104 having an opening threaded to receive a nipple 105 to which a conduit comprising a flexible tube 106 is connected at one end by means of a gland 107. The other end of the pipe 106 is connected by means of a similar gland 108 to the outer end of a nipple 109 which is threaded into an opening formed in the wall 42 so that the compressed gases are delivered into the chamber 43. The chamber 43 in turn is connected with the outlet opening 85, either by means of a duct in the sleeve 38 or by means of a duct 110 formed in the shaft 59, and communicating at its opposite ends respectively with the chamber 43 and the duct 85 through openings 111 formed in the sleeve 38.

The pedestal 39, as shown in Figures 6 and 7, comprises a base plate 112 having an upwardly extending flange 113 formed with a horizontal bead 114. Pedestal means 39 also comprises a split bushing 115 which clampingly receives the sleeve 38 which may be turned in the bushing for purposes of adjustment and the bushing thereafter clamped in place by means of the bolt 116. The bushing 115 has a downwardly extending arm 117 adapted to be secured on the upstanding flange 113 of the base plate by means of a fastening bolt 118 extending through an elongated slot 119 in the arm 117 and an opening in the upstanding flange 113 at the bead 114 so that the arm 117 is lockingly secured on the bead 114 in order to facilitate assembly of the device which is assembled on and principally supported by the motor shaft 21. A suitable ball-bearing 120 is then applied on the sleeve 38 and the bushing 115 assembled in position to secure the bearing 120 snugly between itself and the cover plate 45. The clamp nut 116 is then secured and the holding nut 118 tightened to complete the assembly.

In my co-pending applications Serial Nos. 3,030, 5,712, 15,830 and 28,478, respectively filed January 23, 1935, February 9, 1935, April 11, 1935 and June 26, 1935, I have shown compressor structures including features which are also included in the device of my present invention. I do not, however, claim herein the broader features of invention commonly disclosed herein as well as in my aforesaid co-pending applications in so far as such features form the subject matter of invention claimed in said co-pending applications. It will be seen, however, that the present invention envisages a compressor in which the inlet side is adequately sealed and separated from the outlet side to the end that leakage of the fluid medium from the high pressure to the low pressure side of the machine is substantially eliminated. This is accomplished in a device of simplified yet rugged construction thus enabling the provision of a machine at minimum cost and of light weight in comparison with its operating capacity. The advantages of my present invention are accomplished more particularly by the arrangement of parts providing a removable receiving chamber on the rotating piston at the compressor outlet to facilitate the repair or replacement of the outlet valve; another feature of the invention residing in the particular arrangement for sealing the end plate which rotates upon the piston mounting sleeve; a further feature of the present invention residing in the arrangement of the outlet channel in the piston mounting sleeve. The machine is especially well adapted for use in refrigeration systems employed in portable room-coolers although the invention is not at all restricted to compressors for such use.

It is thought that the invention and numerous of its attendant advantages will be understood from the foregoing description and it is obvious that numerous changes may be made in the form, construction and arrangement of the several parts without departing from the spirit or scope of the invention or sacrificing any of its attendant advantages, the forms herein described being merely preferred embodiments for the purpose of demonstrating the inventive concept.

The invention is hereby claimed as follows:

1. A compressor comprising a pair of spaced apart end plates and an intermediate annular ring clampingly secured together to form a cylindrical working space, a shaft connected to one of said end plates and extending axially of said cylinder, said one end plate having a radial duct therein communicating with said working space adjacent the peripheral portions thereof and forming an inlet for a work medium to said work space, said other end plate having an opening, a sleeve in said opening, bearing means for said other end plate on said sleeve, said other end plate having an integral annular wall embracing said sleeve and defining an annular chamber therewith, a cover plate on said wall for closing said chamber, a seal on said sleeve and operably associated with said cover plate for preventing leakage through said cover plate along the outer surfaces of said sleeve, said other end plate having a fluid outlet opening, an annular channeled element secured to the outer surfaces of said other end plate and forming therewith a receiving chamber for a work medium expelled through said outlet opening, a valve for said outlet opening on said other end plate within said receiving chamber whereby to expose said valve for inspection, repair or replacement upon removal of said annular element from said other end plate, said sleeve having interconnected duct portions therein comprising an outlet passage and including a duct portion opening on the sleeve outwardly of said cover plate and seal, and another duct portion opening laterally on the sleeve inwardly of said cover plate and seal, and means forming a connecting conduit interconnecting said receiving chamber with said duct portion which opens laterally of the sleeve and inwardly of said cover plate and seal.

2. A compressor comprising a pair of spaced apart end plates and an intermediate annular ring clampingly secured together to form a cylindrical working space, a shaft connected to one of said end plates and extending axially of said cylinder, said one end plate having a radial duct therein communicating with said work space adjacent the peripheral portions thereof and forming an inlet for a work medium to said work space, said other end plate having an opening, a sleeve in said opening, bearing means for said other end plate on said sleeve, said other end plate having an integral annular wall embracing said sleeve and defining an annular chamber therewith, a cover plate on said wall for closing said chamber, a seal on said sleeve and operably associated with said cover plate for preventing leakage through said cover plate along the outer surfaces of said sleeve, said other end plate having a fluid outlet, an annular channelled element secured to the outer surfaces of said other end plate and forming therewith a receiving chamber for a work medium expelled through said outlet, a valve for said outlet mounted on said other end plate within said receiving chamber so that removal of said annular element may expose said valve for replacement or repair, a duct extending in said other end plate and communicating with said receiving chamber, and a channel in said sleeve communicating with said duct and forming an outlet passage opening in said sleeve outwardly of said cover plate.

3. A compressor comprising a cylinder and a piston within the cylinder, said cylinder comprising a pair of spaced apart end plates and an intermediate annular ring secured between said end plates and forming therewith a cylindrical working space containing the piston, a shaft connected to one of said end plates and extending axially of said cylinder, said one end plate having a radial duct therein communicating with said work space adjacent the peripheral portions of said cylinder and forming an inlet for a work medium, said other end plate having an opening, a sleeve in said opening, bearing means for said other end plate on said sleeve, said other end plate having an integral annular wall embracing said sleeve and defining an annular chamber therewith, cover means on said wall for closing said chamber, seal means on said sleeve in said annular chamber and operatively associated with said cover means for preventing leakage along the outer surfaces of said sleeve through said other end plate, said other end plate having a fluid outlet from said work space, a channeled element secured to the outer surfaces of the other end plate and forming therewith a receiving chamber for a work medium expelled through said fluid outlet, a valve for said fluid outlet mounted on said other end plate within said receiving chamber whereby removal of said channeled element may expose said valve for replacement or repair, said sleeve having interconnected channel portions forming an outer passage, one of said channel portions opening inwardly and the other outwardly of said cover means, and means forming a conduit connecting the receiving chamber with said channel portion which opens on the sleeve inwardly of said cover means.

4. A compressor comprising a cylinder and a piston within the cylinder, said cylinder comprising a pair of spaced apart end plates and an intermediate annular ring secured between said end plates and forming therewith a cylindrical working space containing the piston, a shaft connected to one of said end plates and extending axially of said cylinder, said one end plate having a radial duct therein communicating with said work space adjacent the peripheral portions of said cylinder and forming an inlet for a work medium, said other end plate having an opening, a sleeve in said opening, bearing means for said other end plate on said sleeve, said other end plate having an integral annular wall embracing said sleeve and defining an annular chamber therewith, cover means on said wall for closing said chamber, seal means on said sleeve in said annular chamber and operatively associated with said cover means for preventing leakage along the outer surfaces of said sleeve through said other end plate, said other end plate having a fluid outlet from said work space, a channeled element secured to the outer surfaces of the other end plate and forming therewith a receiving chamber for a work medium expelled through said fluid outlet, a valve for said fluid outlet mounted on said other end plate within said receiving chamber whereby removal of said channeled element may expose said valve for replacement or repair, said sleeve having interconnected channel portions forming an outer passage, one of said channel portions opening inwardly and the other outwardly of said cover means, means forming a conduit connecting the receiving chamber with said channel portion which opens on the sleeve inwardly of said cover means, and a shaft carried in said sleeve and extending into said cylinder in position to receive and support the piston, one of said shafts having a duct forming an inlet passage communicating with said radial duct at the central portions of said one end plate.

5. A compressor comprising a cylinder and a piston within the cylinder, said cylinder comprising a pair of spaced apart end plates and an intermediate annular ring secured between said end plates and forming therewith a cylindrical working space containing the piston, a shaft connected to one of said end plates and extending axially of said cylinder, said one end plate having a radial duct therein communicating with said work space adjacent the peripheral portions of said cylinder and forming an inlet for a work medium, said other end plate having an opening, a sleeve in said opening, bearing means for said other end plate on said sleeve, said other end plate having an integral annular wall embracing said sleeve and defining an annular chamber therewith, cover means on said wall for closing said chamber, seal means on said sleeve in said annular chamber and operatively associated with said cover means for preventing leakage along the outer surfaces of said sleeve through said other end plate, said other end plate having a fluid outlet from said work space, a channeled element secured to the outer surfaces of the other end plate and forming therewith a receiving chamber for a work medium expelled through said fluid outlet, a valve for said fluid outlet mounted on said other end plate within said receiving chamber whereby removal of said channeled element may expose said valve for replacement or repair, said sleeve having interconnected channel portions forming an outer passage, one of said channel portions opening inwardly and the other outwardly of said cover means, means forming a conduit connecting the receiving chamber with said channel portion which opens on the sleeve inwardly of said cover means, and a shaft carried in said sleeve and extending into said cylinder in position to receive and support the piston, said shaft secured to said one end plate having an axial duct forming an inlet passage communicating with said radial duct at the central portions of said one end plate.

6. A compressor comprising a cylinder and a piston within the cylinder, said cylinder comprising a pair of spaced apart end plates and an intermediate annular ring secured between said end plates and forming therewith a cylindrical working space containing the piston, a shaft connected to one of said end plates and extending axially of said cylinder, said one end plate having a radial duct therein communicating with said work space adjacent the peripheral portions of said cylinder and forming an inlet for a work medium, said other end plate having an opening, a sleeve in said opening, bearing means for said other end plate on said sleeve, said other end plate having an integral annular wall embracing said sleeve and defining an annular chamber therewith, cover means on said wall for closing said chamber, seal means on said sleeve in said annular chamber and operatively associated with said cover means for preventing leakage along the outer surfaces of said sleeve through said other end plate, said other end plate having a fluid outlet from said work space, a channeled element secured to the outer surfaces of the other end plate and forming therewith a receiving chamber for a work medium expelled through said fluid outlet, a valve for said fluid outlet mounted on said other end plate within said receiving chamber whereby removal of said channeled element may expose said valve for replacement or repair, said sleeve having interconnected channel portions forming an outer passage, one of said channel portions opening inwardly and the other outwardly of said cover means, means forming a conduit connecting the receiving chamber with said channel portion which opens on the sleeve inwardly of said cover means, and a shaft carried in said sleeve and extending into said cylinder in position to receive and support the piston, said sleeve supported shaft having a duct forming an inlet passage communicating with said radial duct at the central portions of said one end plate.

7. A compressor comprising a pair of spaced apart end plates and an intermediate annular ring secured together to form a cylindrical working space, a shaft connected to one of said end plates and extending axially of said cylinder, said one end plate having a radial duct therein communicating with said working space adjacent the peripheral portions thereof and forming an inlet for a work medium to said work space, said other end plate having an opening, a sleeve in said opening, bearing means for said other end plate on said sleeve, said other end plate having an integral annular wall embracing said sleeve and defining an annular chamber therewith, cover means on said wall for closing said chamber, a seal on said sleeve and operatively associated with said cover means for preventing leakage through said other end plate along the outer surfaces of said sleeve, said other end plate having a fluid outlet opening, a channeled element secured to the outer surfaces of said other end plate and forming therewith a receiving chamber for a work medium expelled through said outlet opening, a valve for said outlet opening on said other end plate within said receiving chamber whereby to expose said valve for inspection, repair or replacement upon removal of said channeled element from said other end plate, said sleeve having interconnected duct portions therein comprising an outlet passage and including a duct portion opening on the sleeve outwardly of said seal, and another duct portion opening laterally on the sleeve inwardly of said seal, said other duct portion opening upon said annular chamber, and means forming a conduit connecting said receiving chamber with said annular chamber whereby the work medium, expelled from said work space through said outlet opening into the receiving chamber, may pass thence through said conduit into said annular chamber and thence through said outlet passage for delivery outwardly of said cover means.

8. A compressor comprising a pair of spaced apart end plates and an intermediate annular ring secured together to form a cylindrical working space, a shaft connected to one of said end plates and extending axially of said cylinder, said one end plate having a radial duct therein communicating with said working space adjacent the peripheral portions thereof and forming an inlet for a work medium to said work space, said other end plate having an opening, a sleeve in said opening, bearing means for said other end plate on said sleeve, said other end plate having an integral annular wall embracing said sleeve and defining an annular chamber therewith, cover means on said wall for closing said chamber, a seal on said sleeve and operatively associated with said cover means for preventing leakage through said other end plate along the outer surfaces of said sleeve, said other end plate having a fluid outlet opening, a channeled element secured to the outer surfaces of said other end plate and forming therewith a receiving chamber for a work medium expelled through said outlet opening, a valve for said outlet opening on said other end plate within said receiving chamber whereby to expose said valve for inspection, repair or replacement upon removal of said channeled element from said other end plate, said sleeve having interconnected duct portions therein comprising an outlet passage and including a duct portion opening on the sleeve outwardly of said seal, and another duct portion opening laterally on the sleeve inwardly of said seal, means interconnecting said receiving chamber with said duct portion which opens laterally on the sleeve and inwardly of said cover means and seal, said shaft having an axial duct opening laterally on said shaft at a point removed from said one end plate, said axial duct communicating with said radial duct at the central portions of said one end plate, and means forming a sealed chamber about said shaft in communication with the lateral opening of said axial duct.

9. A compressor comprising a pair of spaced apart end plates and an intermediate annular ring secured together to form a cylindrical working space, a shaft connected to one of said end plates and extending axially of said cylinder, said one end plate having a radial duct therein communicating with said working space adjacent the peripheral portions thereof and forming an inlet for a work medium to said work space, said other end plate having an opening, a sleeve in said opening, bearing means for said other end plate on said sleeve, said other end plate having an integral annular wall embracing said sleeve and defining an annular chamber therewith, cover means on said wall for closing said chamber, a seal on said sleeve and operatively associated with said cover means for preventing leakage through said other end plate along the outer surfaces of said sleeve, said other end plate having a fluid outlet opening, a channeled element secured to the outer surfaces of said other end plate and forming therewith a receiving chamber for a work medium expelled through said outlet opening, a valve for said outlet opening on said other end plate within said receiving chamber whereby to expose said valve for inspection, repair or replacement upon removal of said channeled element from said other end plate, said sleeve having interconnected duct portions therein comprising an outlet passage and including a duct portion opening on the sleeve outwardly of said seal, and another duct portion opening laterally on the sleeve inwardly of said seal, said other duct portion opening upon said annular chamber, means forming a conduit connecting said receiving chamber with said annular chamber whereby the work medium, expelled from said work space through said outlet opening into the receiving chamber, may pass thence through said conduit into said annular chamber and thence through said outlet passage for delivery outwardly of said cover means, a shaft supported in said sleeve and extending into said cylinder, and a piston on said shaft within said cylinder, said sleeve supported shaft having an axial duct therein forming an inlet passage communicating with said radial duct at the central portions of said one end plate.

WILLIAM W. WISHART.